(12) United States Patent
Lee et al.

(10) Patent No.: US 11,499,494 B1
(45) Date of Patent: Nov. 15, 2022

(54) METHOD FOR DIAGNOSING FUEL LEAKAGE OF A VEHICLE

(71) Applicants: HYUNDAI MOTOR COMPANY, Seoul (KR); KIA CORPORATION, Seoul (KR)

(72) Inventors: Jeong Seok Lee, Seongnam-si (KR); Ju Tae Song, Hwaseong-si (KR); Dae Hyun Park, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/524,564

(22) Filed: Nov. 11, 2021

(30) Foreign Application Priority Data

Apr. 26, 2021 (KR) .......................... 10-2021-0053410

(51) Int. Cl.
  *F02D 41/22* (2006.01)
  *F02D 41/24* (2006.01)
(52) U.S. Cl.
  CPC .......... *F02D 41/22* (2013.01); *F02D 41/2422* (2013.01); *F02D 2041/225* (2013.01); *F02D 2200/0606* (2013.01); *F02D 2200/703* (2013.01)
(58) Field of Classification Search
  CPC .............. F02D 41/22; F02D 41/2422; F02D 2041/225; F02D 2200/0606; F02D 2200/703

USPC ................ 123/456, 457, 510, 511; 701/107; 73/114.38, 114.43
See application file for complete search history.

(56) References Cited

U.S. PATENT DOCUMENTS 9,857,266 B2 * 1/2018 Tseng .................... G01M 3/025

FOREIGN PATENT DOCUMENTS

| JP | 4491769 B2 | 6/2010 |
| JP | 5617951 B2 | 11/2014 |
| KR | 102052965 B1 | 12/2019 |

* cited by examiner

*Primary Examiner* — Hai H Huynh
(74) *Attorney, Agent, or Firm* — Lempia Summerfield Katz LLC

(57) ABSTRACT

A method for diagnosing fuel leakage of a vehicle includes: measuring a pressure of a fuel tank by a pressure sensor in a closed state of a fuel system during starting-off of the vehicle; measuring an inner temperature of the fuel tank by a temperature sensor; and diagnosing, by a controller, whether or not leakage occurs by performing different leakage diagnoses depending on a pressure condition of the fuel tank. Thus, the controller performs a first leakage diagnosis when a pressure value of the fuel tank, measured in the measuring the pressure of the fuel tank, is within an atmospheric pressure level; performs a second leakage diagnosis when the pressure value is higher than a positive pressure; and performs a third leakage diagnosis when the pressure value is lower than a negative pressure.

11 Claims, 4 Drawing Sheets

METHOD FOR DIAGNOSING FUEL LEAKAGE OF A VEHICLE

BACKGROUND

(a) Technical Field

The present disclosure relates to a method for diagnosing fuel leakage of a vehicle. More particularly, the present disclosure relates to a method for diagnosing fuel leakage of a vehicle in which different leakage diagnoses are performed depending on the pressure condition of a fuel tank with the vehicle turned off after driving, and whether or not leakage occurs is finally determined through pressure behavior by applying negative pressure to a fuel system in an idle state during driving or with the vehicle stopped in the case of a leakage diagnosis.

(b) Background Art

In general, a hybrid electric vehicle means an electric vehicle, which effectively combines two or more different kinds of power sources and thus travels selectively using one of the two power sources depending on the driving state of the vehicle.

Such a hybrid electric vehicle is driven by a driving motor using the power of a battery until the vehicle reaches a designated speed after starting, is driven using the power of an engine in the case of driving at a constant speed, and is driven using both the power of the engine and the power of the battery when the vehicle is accelerated to the maximum speed.

Therefore, because use of fossil fuels, such as gasoline or diesel, is minimized, and thus facilitating improvement in fuel efficiency, and reduction in air pollution due to minimization of exhaust gases, hybrid electric vehicles are being vigorously researched now and are already being mass-produced and sold in developed countries.

However, the hybrid electric vehicle also discharges evaporation gas generated by evaporating fuel stored in a fuel tank as time goes by, even though the amount of the evaporation gas varies depending on the degree of volatility of the fuel. When such evaporation gas is discharged to the atmosphere, fuel may be wasted and also pollution due to discharge of unburned gas may be caused.

Therefore, the hybrid electric vehicle includes an evaporation gas control system configured to supply evaporation gas generated from the fuel tank to the engine. The evaporation gas control system includes the fuel tank configured to store the fuel of the vehicle, an evaporation gas collector connected to the fuel tank via a pipe line so as to collect the evaporation gas generated from the fuel tank, and a supply pipe line configured to supply the evaporation gas from the evaporation gas collector to the engine of the vehicle.

However, when leakage occurs in the evaporation gas control system, pollution due to the evaporation gas is unstoppable. Thus, automobile manufacturers are seeking methods for detecting leakage in the evaporation gas control system.

The above information disclosed in this Background section is only to enhance understanding of the background of the present disclosure. Therefore, the Background section may contain information that does not form the prior art that is already known in this country to a person of ordinary skill in the art.

SUMMARY

The present disclosure has been made in an effort to solve the above-described problems associated with the prior art.

It is an object of the present disclosure to provide a method for diagnosing fuel leakage of a vehicle in which different leakage diagnoses are performed depending on the pressure condition of a fuel tank, i.e., depending on whether or not the pressure of the fuel tank is about atmospheric pressure, corresponds to a positive pressure forming condition of the fuel tank, or corresponds to a negative pressure forming condition of the fuel tank with the vehicle turned off after driving. The leakage is diagnosed by comparing a change in the pressure of the fuel tank with a designated value after a designated time elapses. The leakage is diagnosed again in consideration of a change in temperature together with the change in the pressure. When suspected leakage is diagnosed, whether or not leakage actually occurs is finally diagnosed through pressure behavior by applying negative pressure to a fuel system in an idle state during driving or with the vehicle stopped. Thus, the accuracy in a result of a leakage diagnosis may be improved.

In one aspect, the present disclosure provides a method for diagnosing fuel leakage of a vehicle. The method includes measuring a pressure of a fuel tank by a pressure sensor in a closed state of a fuel system during a turned-off period of the vehicle, i.e., when the vehicle is turned off. The method also includes measuring an inner temperature of the fuel tank by a temperature sensor, and diagnosing, by a controller, whether or not leakage occurs by performing different leakage diagnoses depending on a pressure condition of the fuel tank. Thus, the controller performs first leakage diagnosis when a pressure value of the fuel tank, measured in the measuring the pressure of the fuel tank, is within an atmospheric pressure level. The controller also performs a second leakage diagnosis when the pressure value is higher than a positive pressure. The controller also performs a third leakage diagnosis when the pressure value is lower than a negative pressure.

In an embodiment, the diagnosing, by the controller, of whether or not the leakage occurs, when the first leakage diagnosis is performed, may include opening, by the controller, the fuel system and then closing the fuel system again. The diagnosing of whether or not the leakage occurs may also include primarily comparing, by the controller, a change in the pressure value measured by the pressure sensor and a change in a temperature value measured by the temperature sensor with a pressure threshold and a temperature threshold, after a first standby time elapses.

In another embodiment, when the change in the pressure value and the change in the temperature value exceed the pressure threshold and the temperature threshold as a result of the primary comparison, the controller may diagnose no leakage.

In still another embodiment, the diagnosing, by the controller, whether or not the leakage occurs, when the change in the pressure value and the change in the temperature value are equal to or less than the pressure threshold and the temperature threshold, respectively, as a result of the primary comparison, may further include secondarily comparing, by the controller, a ratio of the pressure value to the temperature value with a mapping value in a leakage determination table, after a second standby time elapses.

In yet another embodiment, when the ratio of the pressure value to the temperature value exceeds the mapping value in the leakage determination table as a result of the secondary comparison, the controller may diagnose no leakage. When the ratio of the pressure value to the temperature value is equal to or less than the mapping value in the leakage determination table, the controller may diagnose a suspected leakage.

In still yet another embodiment, the diagnosing, by the controller, whether or not the leakage occurs, when the second leakage diagnosis is performed, may include diagnosing, by the controller, no leakage, when the pressure value is equal to or higher than the positive pressure, after a standby time elapses. The diagnosing whether or not the leakage occurs may also include comparing, by the controller, a change in a temperature value measured by the temperature sensor with a designated value, when the pressure value is lower than the positive pressure, after the standby time elapses.

In a further embodiment, when the pressure value is lower than the positive pressure and the change in the temperature value is greater than 0 as a result of the comparison, the controller may diagnose a suspected leakage.

In another further embodiment, when the pressure value is lower than the positive pressure and the change in the temperature value is not greater than 0, the controller may perform the first leakage diagnosis.

In still another further embodiment, the diagnosing, by the controller, whether or not the leakage occurs, when the third leakage diagnosis is performed, may include diagnosing, by the controller, no leakage, when the pressure value is equal to or less than the negative pressure, after a standby time elapses. The diagnosing whether or not the leakage occurs may also include comparing, by the controller, a change in a temperature value measured by the temperature sensor with a designated value, when the pressure value exceeds the negative pressure, after the standby time elapses.

In yet another further embodiment, when the pressure value exceeds the negative pressure and the change in the temperature value is less than 0 as a result of the comparison, the controller may diagnose a suspected leakage.

In still yet another further embodiment, when the pressure value exceeds the negative pressure and the change in the temperature value is not less than 0, the controller may perform the first leakage diagnosis.

In a still further embodiment, the method may further include, when the controller diagnoses a suspected leakage in the diagnosing, by the controller, whether or not the leakage occurs, converting, by the controller, the vehicle into a starting-on state, i.e., with the vehicle on or running, generating the negative pressure in the fuel tank. The method may also include finally determining, by the controller, whether or not the leakage occurs through a change in the pressure value in a state in which the negative pressure is maintained.

The above and other features, aspects, and embodiments of the present disclosure are discussed below.

BRIEF DESCRIPTION OF THE DRAWINGS

The above and other features of the present disclosure are now described in detail with reference to certain embodiments thereof illustrated in the accompanying drawings. The drawings are given hereinbelow by way of illustration only and thus do not limit the present disclosure, and wherein.

It should be understood that the appended drawings are not necessarily to scale and may present a somewhat simplified representation of various features illustrating the basic principles of the disclosure. The specific design features of the present disclosure as disclosed herein, including, for example, specific dimensions, orientations, locations, and shapes, should be determined in part by the particular intended application and use environment.

In the figures, reference numbers refer to the same or equivalent parts of the present disclosure throughout the several figures of the drawings.

DETAILED DESCRIPTION

Hereinafter reference is made in detail to various embodiments of the present disclosure, examples of which are illustrated in the accompanying drawings and described below.

Advantages and features of the present disclosure and methods for achieving the same should become apparent from the descriptions of embodiments given herein below with reference to the accompanying drawings.

However, the present disclosure is not limited to the embodiments disclosed herein and may be implemented in various different forms. The embodiments are provided to make the description of the present disclosure thorough and to fully convey the scope of the present disclosure to those having ordinary skill in the art. It should be noted that the scope of the present disclosure is defined only by the claims.

In the following description of the present disclosure, a detailed description of known functions and configurations incorporated herein has been omitted where it may make the subject matter of the present disclosure rather unclear.

When a component, device, element, or the like of the present disclosure is described as having a purpose or performing an operation, function, or the like, the component, device, or element should be considered herein as being "configured to" meet that purpose or to perform that operation or function.

Figure 1:
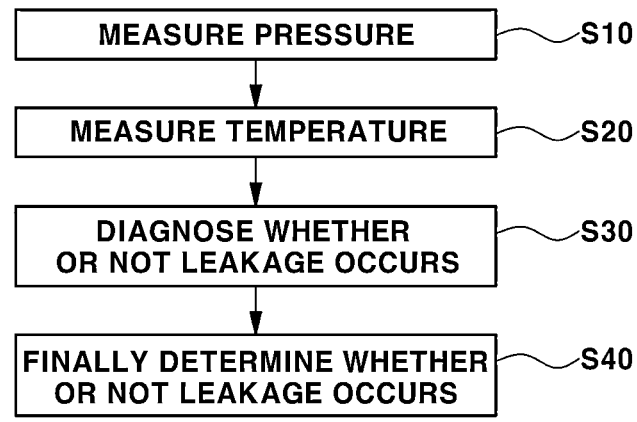
FIG. 1 is a flowchart schematically representing a method for diagnosing fuel leakage of a vehicle according to one embodiment of the present disclosure.
Figure 2:
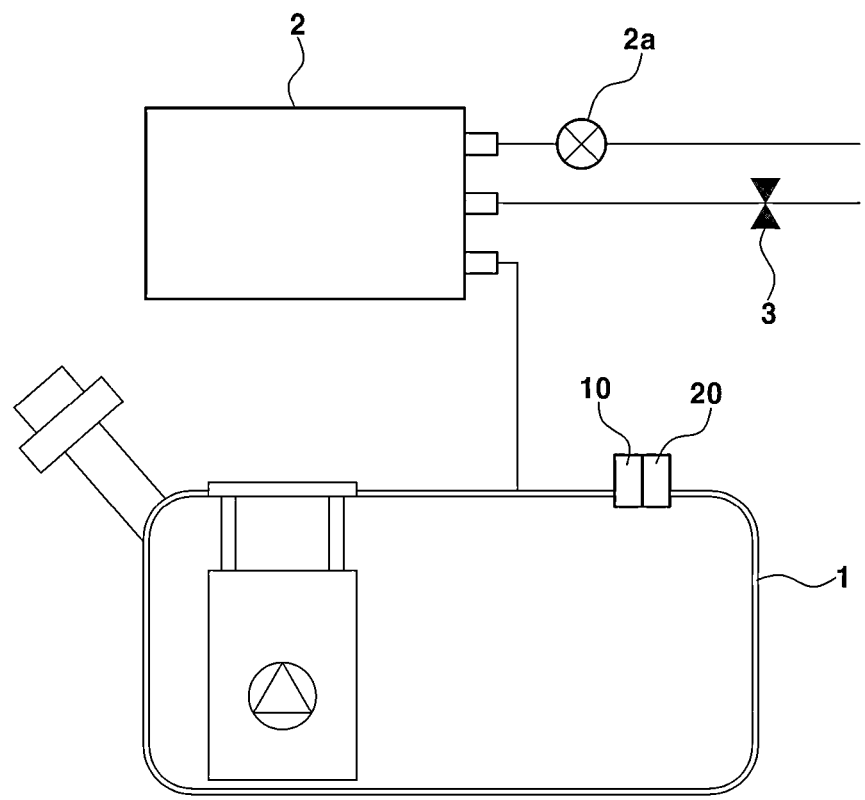
FIG. 2 is a view illustrating a fuel system in the method for diagnosing fuel leakage according to one embodiment of the present disclosure.
Figure 3:
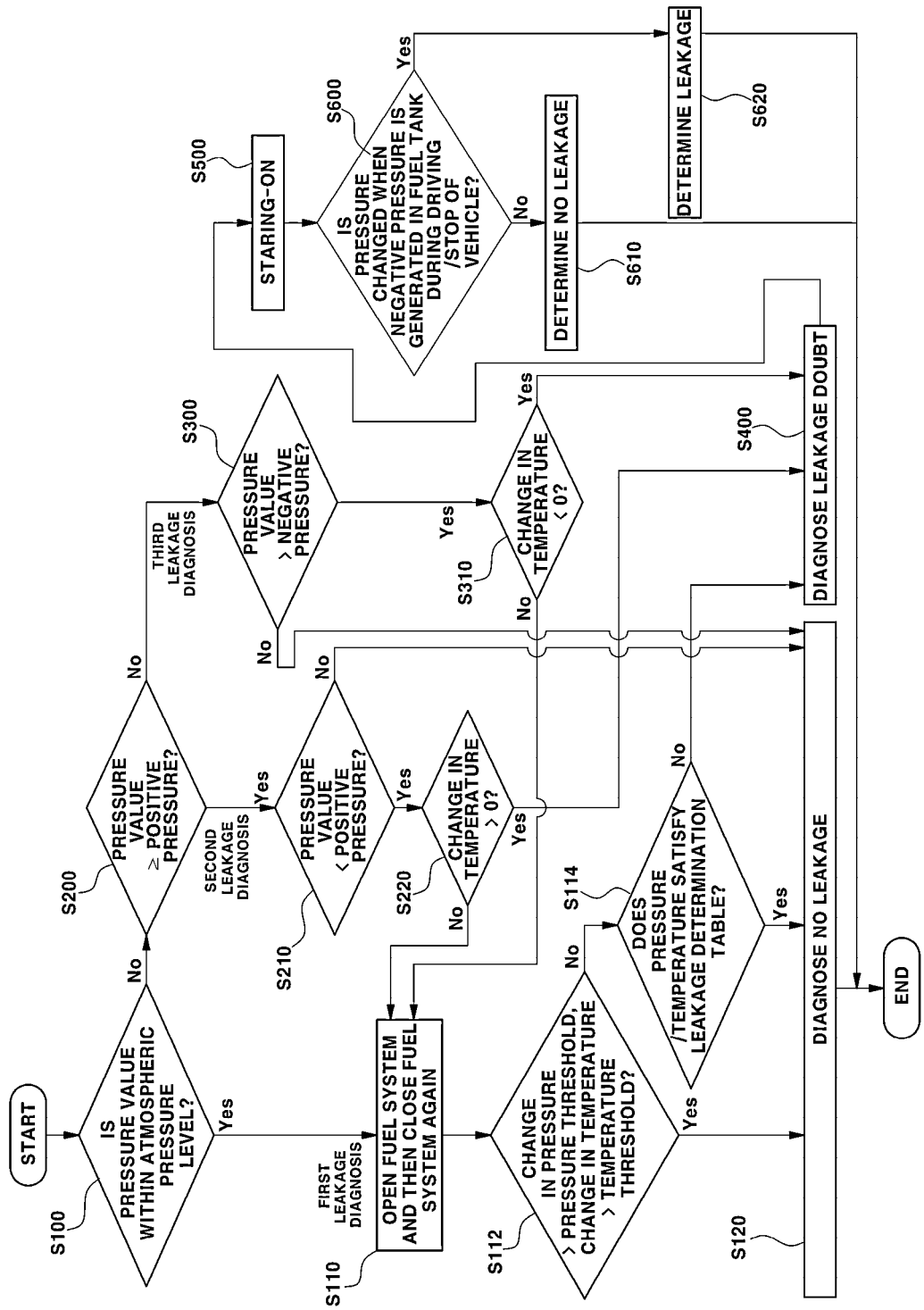
FIG. 3 is a flowchart sequentially representing the method for diagnosing fuel leakage according to one embodiment of the present disclosure.

FIG. 1 is a flowchart schematically representing a method for diagnosing fuel leakage of a vehicle according to one embodiment of the present disclosure. FIG. 2 is a view illustrating a fuel system in the method for diagnosing fuel leakage according to one embodiment of the present disclosure. FIG. 3 is a flowchart sequentially representing the method for diagnosing fuel leakage according to one embodiment of the present disclosure.

Figure 4:
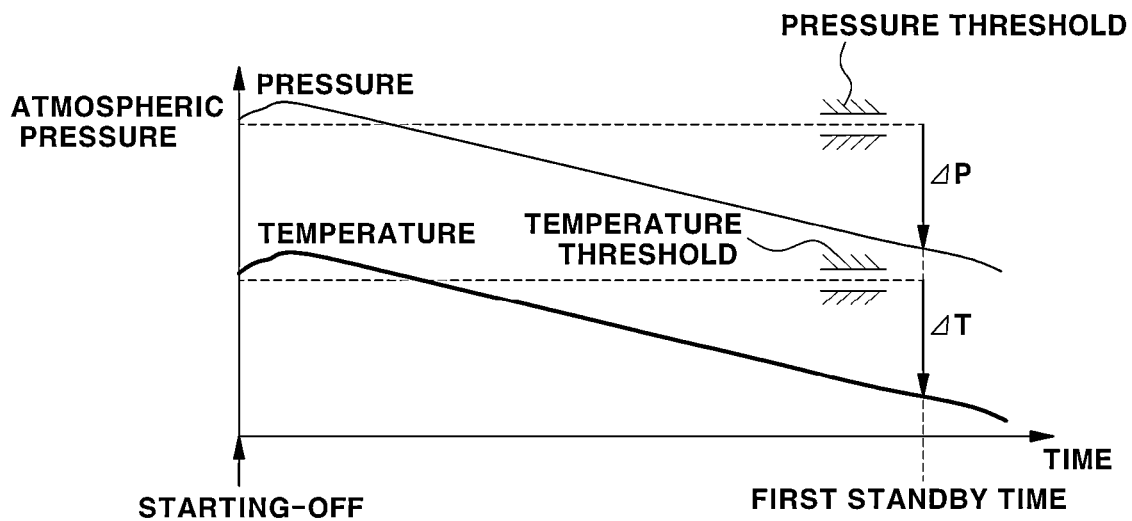
FIG. 4 is a graph representing diagnosis results in a primary comparison in the method for diagnosing fuel leakage according to one embodiment of the present disclosure.
Figure 5:
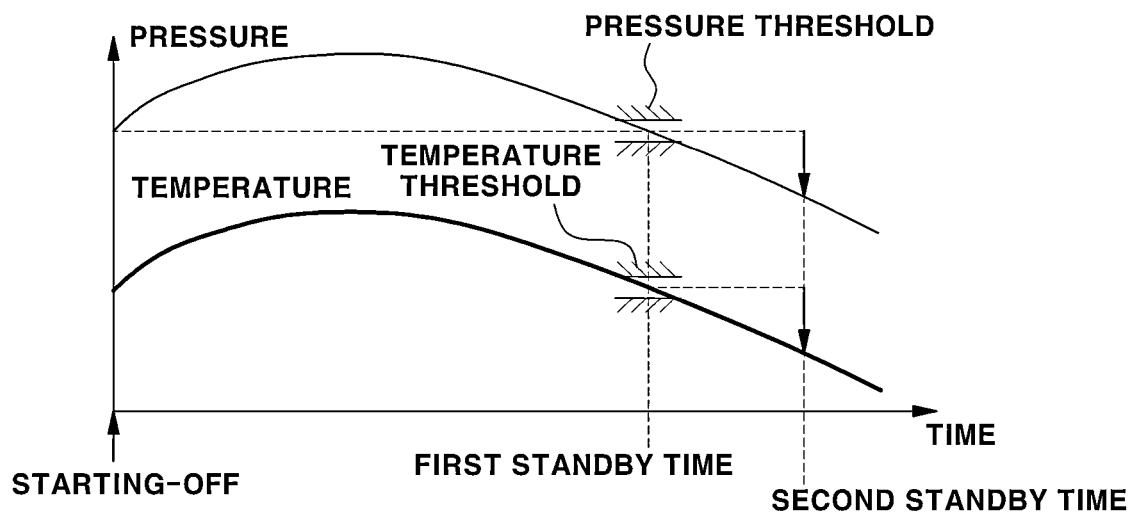
FIG. 5 is a graph representing diagnosis results in a secondary comparison in the method for diagnosing fuel leakage according to one embodiment of the present disclosure.
Figure 6:
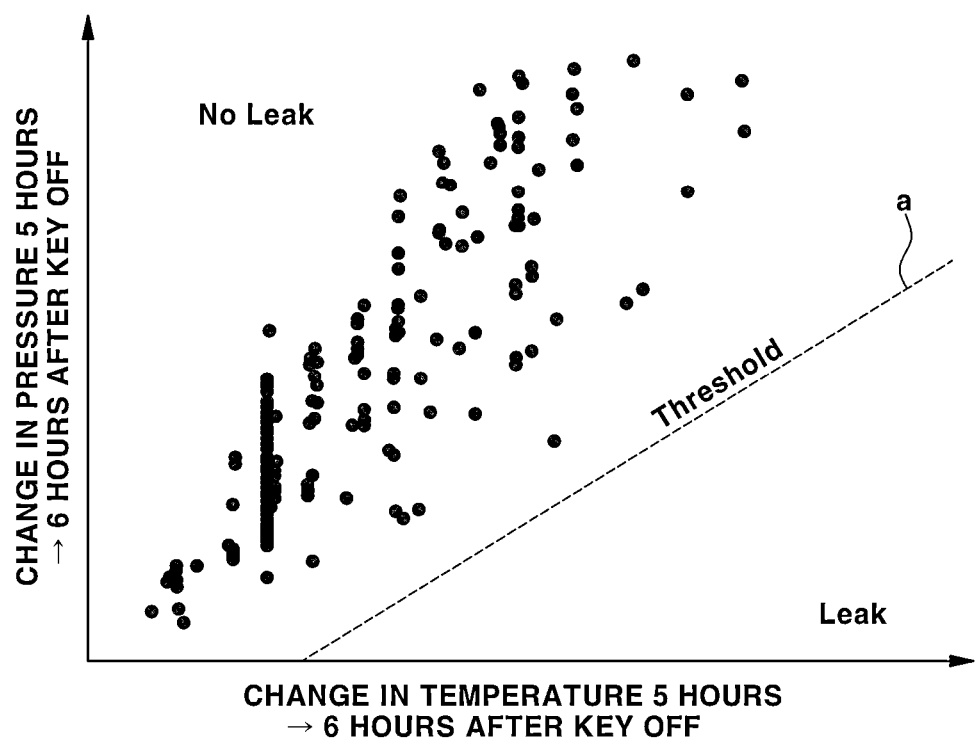
FIG. 6 is a graph representing mapping values in a leakage determination table in the method for diagnosing fuel leakage according to one embodiment of the present disclosure.

FIG. 4 is a graph representing diagnosis results in a primary comparison in the method for diagnosing fuel leakage according to one embodiment of the present disclosure. FIG. 5 is a graph representing diagnosis results in a secondary comparison in the method for diagnosing fuel leakage according to one embodiment of the present disclosure. FIG. 6 is a graph representing mapping values in a leakage determination table in the method for diagnosing fuel leakage according to one embodiment of the present disclosure.

As shown in FIG. 1, a method for diagnosing fuel leakage of a vehicle according to one embodiment of the present disclosure includes measuring pressure (S10), measuring temperature (S20), and diagnosing whether or not leakage occurs (S30).

First, in the measurement of the pressure (S10), the pressure of a fuel tank 1 is measured through a pressure sensor 10 in the state in which a fuel system is closed.

As shown in FIG. 2, the fuel system is generally configured such that a canister 2 collects gas evaporated in the fuel tank 1 and supplies the gas to a surge tank, an intake manifold, or a throttle body through duty control of a purge control solenoid valve (PCSV) 3. This is done to prevent hesitation of an engine during engine idling or at the time of partial load.

In a starting-off state, i.e., with the vehicle turned off after driving, both a cutoff valve 2a of the canister 2 and the PCSV 3 are closed. In such a closed state of the fuel system, the pressure of the fuel tank 1 is measured by a pressure sensor 10.

Further, in the measurement of the temperature (S20), the temperature of the fuel tank 1 is measured. The initial temperature of the fuel tank 1 and the temperature of the fuel tank 1 after a set time elapses are respectively measured by a temperature sensor 20. A change in a temperature value is measured by a controller. Such a change in the temperature and the pressure of the fuel tank 1 are used as conditions for diagnosing leakage.

The temperature sensor 20 is disposed adjacent to the pressure sensor 10, as shown in FIG. 2. The reason for this is to measure both the pressure and the temperature at the same position so as to improve accuracy of leakage diagnosis.

In the diagnosis as to whether or not the leakage occurs (S30), when the pressure value of the fuel tank 1 measured in the measurement of the pressure (S10) is maintained at an atmospheric pressure level, a first leakage diagnose is performed. When the pressure value is higher than positive pressure or lower than negative pressure, a second or third leakage diagnosis is performed. Thus, different leakage diagnoses may be performed depending on the pressure condition of the fuel tank 1.

As described above, in the method for diagnosing fuel leakage of the vehicle according to this embodiment of the present disclosure, different leakage diagnoses, i.e., a first leakage diagnosis, a second leakage diagnosis, and a third leakage diagnosis, depending on the pressure condition of the fuel tank 1 are described below with reference to FIG. 3.

First Leakage Diagnosis

In the starting-off state after driving, i.e., with the vehicle turned off, the pressure of the fuel tank 1 is measured by the pressure sensor 10 in the closed state of the fuel system. When it is determined that the measured pressure of the fuel tank 1 is lower than the positive pressure and is higher than the negative pressure, i.e., is maintained at the atmospheric pressure level (Yes in S100), the controller opens the fuel system and then closes the fuel system again (S110).

In order to diagnose leakage of the fuel system, after the cut off valve 2a is opened and is then closed again (S110), the corresponding vehicle is left for a first standby time. For example, the first standby time may be 5 hours. Then, whether or not leakage occurs is diagnosed. A change in the pressure value measured by the pressure sensor 10 and a change in the temperature value measured by the temperature sensor 20 are compared to a pressure threshold and a temperature threshold, respectively (S112).

Here, when the change in the pressure value and the change in the temperature value respectively exceed the pressure threshold and the temperature threshold (Yes in S112), the controller diagnoses no leakage (S120).

Because the pressure threshold and the temperature threshold are set to an atmospheric pressure change and an ambient temperature change, as shown in FIG. 4, when the change in the pressure value and the change in the temperature value are greater than the atmospheric pressure change and the ambient temperature change after the first standby time elapses, these differences are caused by opening of the cutoff valve 2a, when the cut off valve 2a is opened and is then closed again (S110), regardless of the atmospheric pressure and the ambient temperature. Thus, no leakage may be diagnosed.

When the change in the pressure value and the change in the temperature value are respectively equal to or less than the pressure threshold and the temperature threshold (No in S112), i.e., when the change in the pressure value and the change in the temperature value are within the atmospheric pressure level and an ambient temperature level, as shown in FIG. 5, it is primarily diagnosed that the pressure value and the temperature value are changed to the atmospheric pressure level and the ambient temperature level due to leakage occurring when the cut off valve 2a is opened and is then closed again (S110).

Thereafter, after a second standby time shorter than the first standby time, for example, 1 hour, elapses, the controller compares a ratio of the pressure value to the temperature value with a mapping value in a leakage determination table in order to secondarily diagnose leakage (S114).

Here, when the ratio of the pressure value to the temperature value is greater than the mapping value, which is calculated in advance, and is located at a position higher than a threshold slope corresponding to the mapping value (with reference to FIG. 6) (Yes in S114), the controller diagnoses no leakage based on the leakage determination table (S120). When the opposite occurs (No in S114), the controller diagnoses a suspected leakage (S400).

Accordingly, because, in the closed state of the fuel system, a pressure rising condition corresponds to the case that the temperature of the fuel tank 1 is raised or to the case that the vehicle travels to a region having a high altitude. Also, a pressure lowering condition corresponds to the case that the temperature of the fuel tank 1 is lowered or to the case that the vehicle travels to a region having a low altitude. When the ratio of the pressure value to the temperature value is located at a position lower than the threshold slope, it is considered that the temperature is increased but the pressure is decreased.

Therefore, when the pressure is not changed in response to the temperature change in the closed state of the fuel system, the controller diagnoses a suspected leakage.

Second Leakage Diagnosis

In the starting-off state after driving, i.e., when the vehicle is turned off of not running, when the pressure of the fuel tank 1 measured by the pressure sensor 10 in the closed state of the fuel system is not within the atmospheric pressure level (No in S100), the controller determines whether or not the pressure of the fuel tank 1 is equal to or higher than the positive pressure (S200).

In other words, in the starting-off state after driving, when it is determined that the pressure of the fuel tank 1 measured in the closed state of the fuel system is not within the atmospheric pressure level (No in S100), the controller compares the pressure value measured in the above manner with the positive pressure after a standby time, for example, 1 hour, elapses to determine whether the measured pressure value drops below the positive pressure (S210). When the measured pressure value is maintained to be equal to or higher than the positive pressure (No in S210), the controller diagnoses no leakage (S120).

On the other hand, when the measured pressure value is lower than the positive pressure, after the standby time elapses (Yes in S210), the controller compares the change in the temperature value with a designated value in order to diagnose whether or not leakage is suspected (S220).

Here, when the measured pressure value is lower than the positive pressure (Yes in S210) and the temperature value is increased, i.e., the change in the temperature value is greater than 0 (Yes in S220), the pressure of the fuel tank 1 is decreased towards atmospheric pressure in spite of the increase in the temperature, i.e., the pressure is not changed in response to the change in the temperature. Thus, the controller diagnoses a suspected leakage (S400).

On the other hand, when the measured pressure value is lower than the positive pressure (Yes in S210) and the temperature value is also decreased, i.e., the change in the temperature value is not greater than 0 (No in S220), both the temperature and the pressure of the fuel tank 1 are decreased. Thus, it is determined that a detailed diagnosis is necessary. The method then returns to the above first comparison (S110) so that the first leakage diagnosis is sequentially performed.

Third Leakage Diagnosis

In the starting-off state after driving, i.e., when the vehicle is turned off or not running, as a result of the determination as to whether or not the pressure of the fuel tank 1 measured by the pressure sensor 10 in the closed state of the fuel system is equal to or higher than the positive pressure (No in S200), when the measured pressure value is maintained to be less than the negative pressure after a standby time, for example, 1 hour, elapses (No in S300), the controller diagnoses no leakage (S120).

When the pressure value exceeds the negative pressure (Yes in S300), the controller compares the change in the temperature value measured by the temperature sensor 20 with a designated value (S310).

Here, when the measured pressure value exceeds the negative pressure (Yes in S300) and the temperature value is decreased, i.e., the change in the temperature value is less than 0 (Yes in S310), the pressure of the fuel tank 1 is restored towards atmospheric pressure in spite of the decrease in the temperature, i.e., the pressure is not changed in response to the change in the temperature. Thus, the controller diagnoses a suspected leakage (S400).

On the other hand, when the measured pressure value exceeds the negative pressure (Yes in S300) and the temperature value is increased, i.e., the change in temperature value is not less than 0 (No in S310), both the temperature and the pressure of the fuel tank 1 are increased. Thus, it is determined that a detailed diagnosis is necessary. The method then returns to the above first comparison (S110) so that the first leakage of diagnosis is sequentially performed.

The method for diagnosing fuel leakage according to this embodiment of the present disclosure may further include finally determining leakage (S40) in addition to the measurement of the pressure (S10), the measurement of the temperature (S20), and the diagnosis as to whether or not the leakage occurs (S30) (with reference to FIG. 1).

In the final determination of the leakage (S40), when the controller diagnoses a suspected leakage in the diagnosis as to whether or not the leakage occurs (S30), the controller converts the vehicle into the starting-on state (S500), i.e., turns the vehicle on, generates negative pressure in the fuel tank 1, and finally determines whether or not leakage occurs through a change in the pressure value in the state in which the negative pressure is maintained.

In more detail, in the starting-on state, the pressure in the fuel tank 1 is in the atmospheric pressure state, the fuel system is closed by closing the cutoff valve 2a and the PCSV 3, and the negative pressure is generated in the fuel tank 1 by opening the PCSV 3 in this state.

In other words, in the state in which the closed circuit is formed in the closed fuel tank 1, when the PCSV 3 is open, the negative pressure is generated in the fuel tank 1 due to suction of fuel by the engine.

When the negative pressure is generated through such a process, the negative pressure is maintained by opening the PCSV 3 and maintaining the closed state of the cutoff valve 2a. When the PCSV 3 is closed in this state, the engine is stopped, and the negative pressure is no longer generated.

When the PCSV 3 is closed, a change in the pressure occurs in the fuel system if leakage occurs. The controller determines whether or not such a change in the pressure occurs (S600) and finally determines a leakage (S620) occurs when the change in the pressure is sensed (Yes in S600) or determines no leakage (S610) when no change in the pressure is sensed (No in S600).

Therefore, in this embodiment, different leakage diagnoses, i.e., a first leakage diagnosis, a second leakage diagnosis, and a third leakage diagnosis, are performed depending on pressure conditions of the fuel tank 1.

In this embodiment, when the first leakage diagnosis, the second leakage diagnosis, and the third leakage diagnosis are performed, whether or not leakage occurs is diagnosed in consideration of not only a pressure change condition but also a temperature change condition. When a suspected leakage is diagnosed, whether or not leakage occurs is finally determined through pressure behavior by applying negative pressure to the fuel system in an idle state during driving or with the vehicle stopped. Thus, the accuracy in a result of leakage diagnosis may be improved.

Thereby, in this embodiment, the pressure sensor 10 and the temperature sensor 20, which are relatively inexpensive, are installed instead of a separate leakage diagnose module, so as to diagnose leakage of the fuel tank 1 depending on changes in pressure and temperature. Thus, the cost reduction in leakage diagnosis may be achieved.

As apparent from the above description, the present disclosure provides a method for diagnosing fuel leakage of a vehicle in which different leakage diagnoses are performed depending on the pressure condition of a fuel tank. In other words, which diagnosis is performed depends on whether or not the pressure of the fuel tank is at about atmospheric pressure, corresponds to a positive pressure forming condition of the fuel tank, or corresponds to a negative pressure forming condition of the fuel tank in a starting-off state after driving. Whether or not leakage occurs is diagnosed by comparing a change in the pressure of the fuel tank with a designated value after a designated time elapses and whether or not leakage occurs is diagnosed again in consideration of a change in temperature together with the change in the pressure.

When a suspected leakage is diagnosed, whether or not leakage occurs is finally determined through pressure behavior by applying negative pressure to a fuel system in an idle state during driving or with the vehicle stopped. Thus, the accuracy in a result of leakage diagnosis may be improved.

Thereby, in the present disclosure, a pressure sensor and a temperature sensor, which are relatively inexpensive, are installed instead of a separate leakage diagnose module, so as to diagnose leakage of the fuel tank depending on changes in pressure and temperature. Thus, cost reduction in leakage diagnosis may be achieved.

The inventive concept has been described in detail with reference to embodiments thereof. However, it should be appreciated by those having ordinary skill in the art that changes may be made in these embodiments without departing from the principles and spirit of the present disclosure, the scope of which is defined in the appended claims and their equivalents.

What is claimed is:

1. A method for diagnosing fuel leakage of a vehicle, the method comprising:
    measuring, by a pressure sensor, a pressure of a fuel tank to obtain a pressure value when a controller has closed both a cutoff valve and a purge control solenoid valve (PCSV) of a canister, thereby closing a fuel system with the vehicle turned off;
    measuring, by a temperature sensor, an inner temperature of the fuel tank to obtain a temperature value;
    diagnosing, by the controller, whether or not a leakage occurs through a plurality of leakage diagnoses to be performed depending on a pressure condition of the fuel tank, the plurality of leakage diagnoses comprising:
        a first leakage diagnosis to be performed by the controller, which compares a change in the pressure value and a change in the temperature value with thresholds thereof, respectively, after the cut off valve has been opened and then closed, when the pressure value of the fuel tank, as obtained in the measuring of the pressure of the fuel tank, is within an atmospheric pressure level;
        a second leakage diagnosis to be performed by the controller when the pressure value is positive relative to the atmospheric pressure level; and
        a third leakage diagnosis to be performed by the controller when the pressure is negative relative to the atmospheric pressure level; and
    turning on, by the controller, the vehicle, and opening the PCSV with the cutoff valve closed, thereby generating a negative pressure in the fuel tank, when a leakage is suspected in the diagnosing, and then closing the PCSV under the negative pressure, thereby finally confirming whether the leakage actually occurs based on a change in the pressure value.

2. The method of claim 1, wherein the diagnosing, by the controller, whether or not the leakage occurs, when the first leakage diagnosis is performed, comprises:
    opening, by the controller, the fuel system and then closing the fuel system again; and
    primarily comparing, by the controller, a change in the pressure value measured by the pressure sensor and a change in a temperature value measured by the temperature sensor with a pressure threshold and a temperature threshold, respectively, after a first standby time elapses.

3. The method of claim 2, wherein, when the change in the pressure value and the change in the temperature value exceed the pressure threshold and the temperature threshold, respectively, as a result of the primary comparison, the controller diagnoses no leakage.

4. The method of claim 2, wherein the diagnosing, by the controller, whether or not the leakage occurs, when the change in the pressure value and the change in the temperature value are equal to or less than the pressure threshold and the temperature threshold, respectively, as a result of the primary comparison, further comprises:
    secondarily comparing, by the controller, a ratio of the pressure value to the temperature value with a mapping value in a leakage determination table, after a second standby time elapses.

5. The method of claim 4, wherein, when the ratio of the pressure value to the temperature value exceeds the mapping value in the leakage determination table as a result of the secondary comparison, the controller diagnoses no leakage and, when the ratio of the pressure value to the temperature value is equal to or less than the mapping value in the leakage determination table, the controller diagnoses a suspected leakage.

6. The method of claim 1, wherein the diagnosing, by the controller, whether or not the leakage occurs, when the second leakage diagnosis is performed, comprises:
    diagnosing, by the controller, no leakage, when the pressure value is equal to or higher than the positive pressure, after a standby time elapses; and
    comparing, by the controller, a change in a temperature value measured by the temperature sensor with a designated value, when the pressure value is lower than the positive pressure, after the standby time elapses.

7. The method of claim 6, wherein, when the pressure value is lower than the positive pressure and the change in the temperature value is greater than 0 as a result of the comparison, the controller diagnoses a suspected leakage.

8. The method of claim 6, wherein, when the pressure value is lower than the positive pressure and the change in the temperature value is not greater than 0, the controller performs the first leakage diagnosis.

9. The method of claim 1, wherein the diagnosing, by the controller, whether or not the leakage occurs, when the third leakage diagnosis is performed, comprises:
    diagnosing, by the controller, no leakage, when the pressure value is equal to or less than the negative pressure, after a standby time elapses; and
    comparing, by the controller, a change in a temperature value measured by the temperature sensor with a designated value, when the pressure value exceeds the negative pressure, after the standby time elapses.

10. The method of claim 9, wherein, when the pressure value exceeds the negative pressure and the change in the temperature value is less than 0 as a result of the comparison, the controller diagnoses a suspected leakage.

11. The method of claim 9, wherein, when the pressure value exceeds the negative pressure and the change in the temperature value is not less than 0, the controller performs the first leakage diagnosis.

* * * * *